(No Model.) 6 Sheets—Sheet 1.
A. G. BEALE.
CORN PLANTER.
No. 377,059. Patented Jan. 31, 1888.
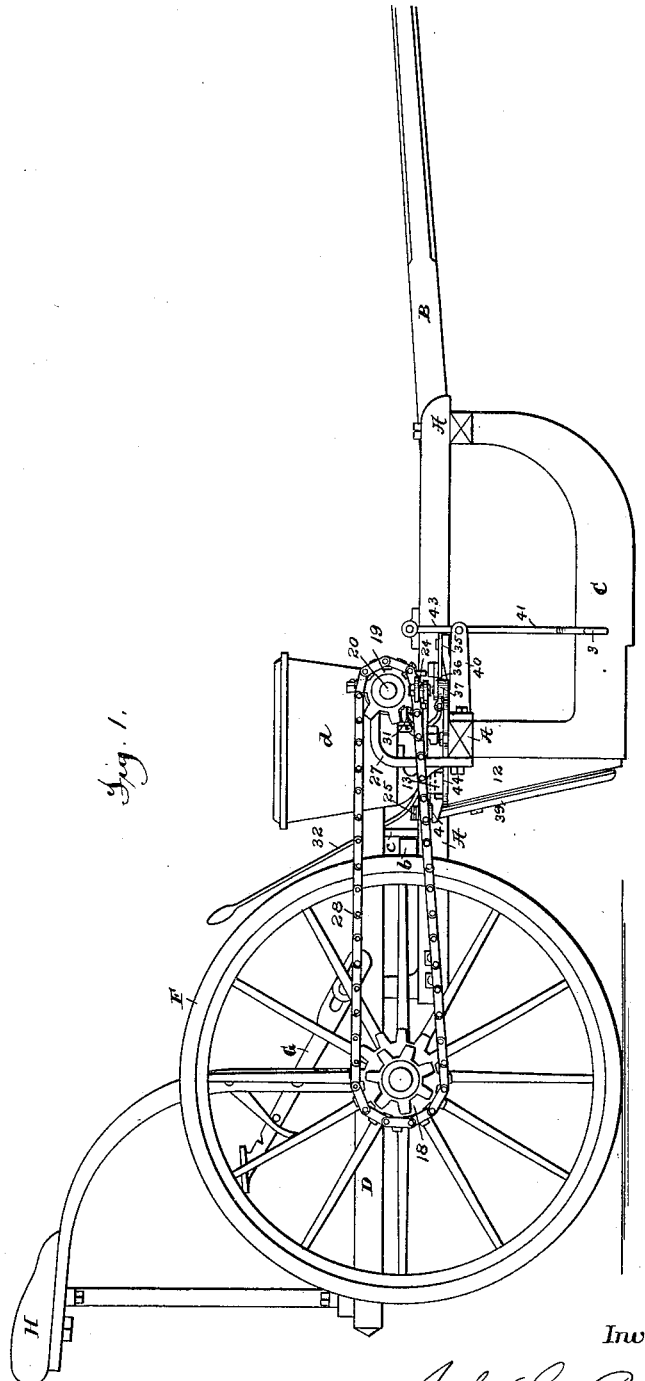
Attest:
Geo. H. Botts.
J. A. Hovey
Inventor:
Alfred G. Beale
by Munson & Philipp
Attys:

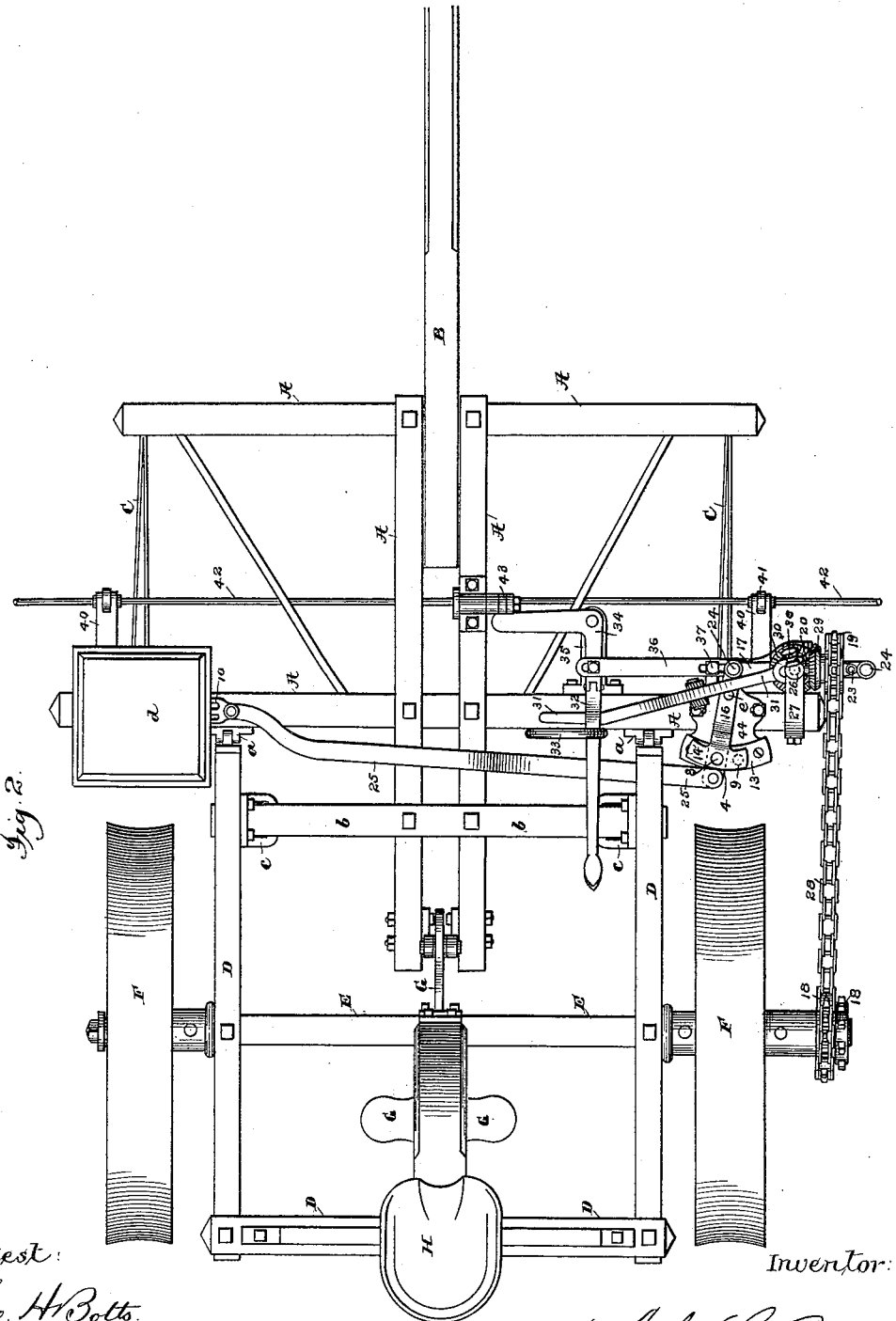

(No Model.) 6 Sheets—Sheet 3.
A. G. BEALE.
CORN PLANTER.
No. 377,059. Patented Jan. 31, 1888.
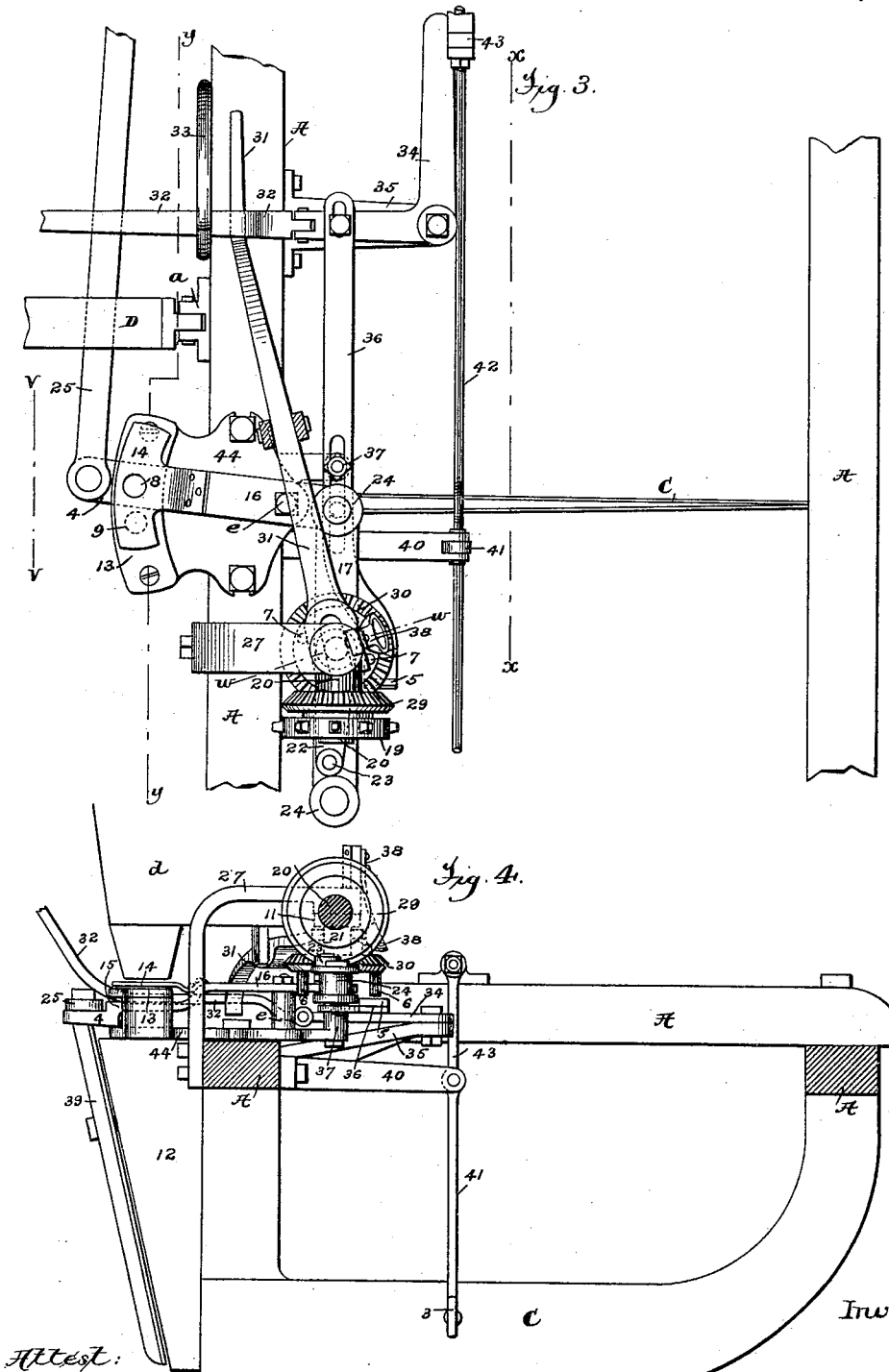

(No Model.) 6 Sheets—Sheet 4.
A. G. BEALE.
CORN PLANTER.
No. 377,059. Patented Jan. 31, 1888.
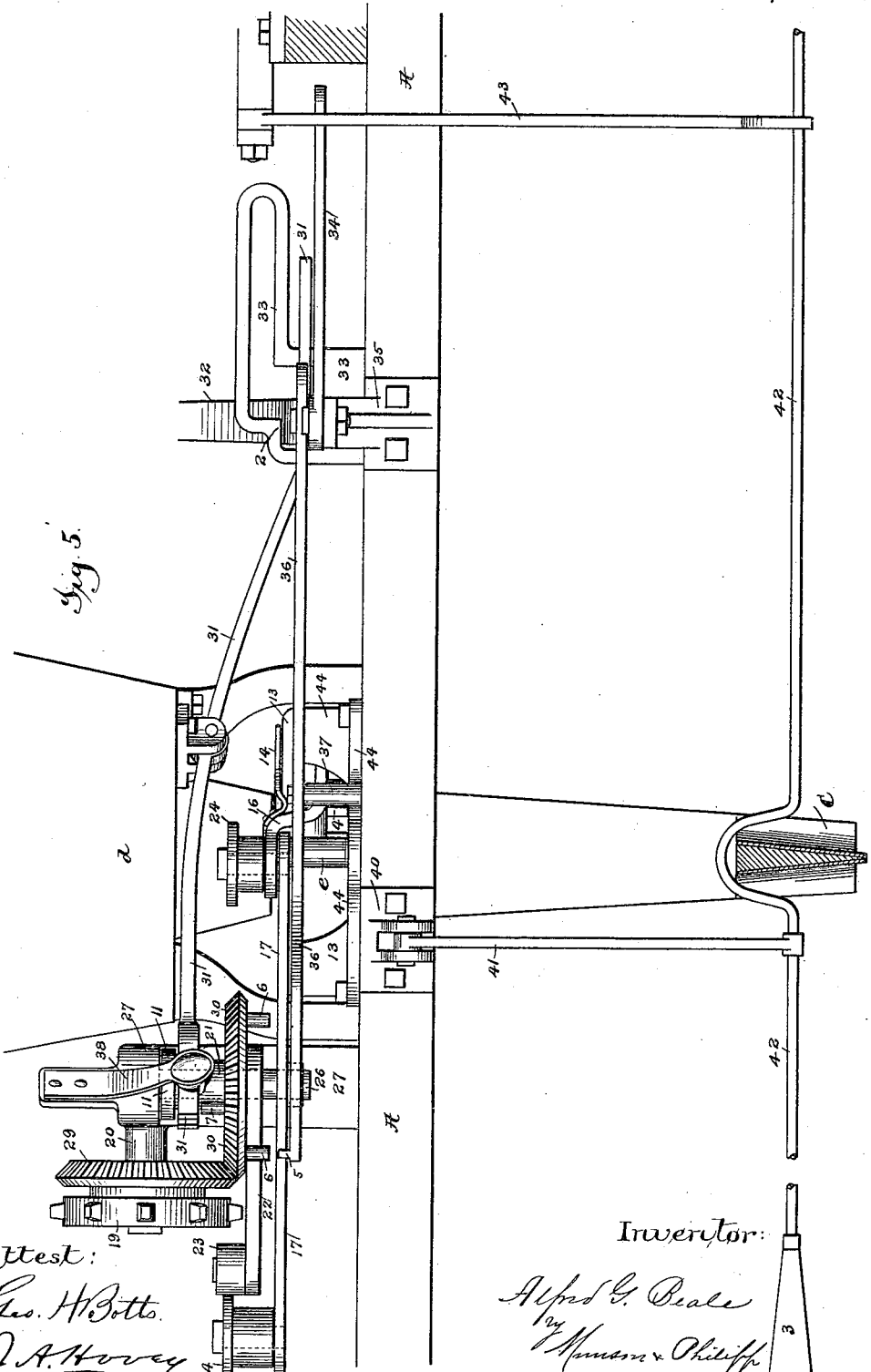

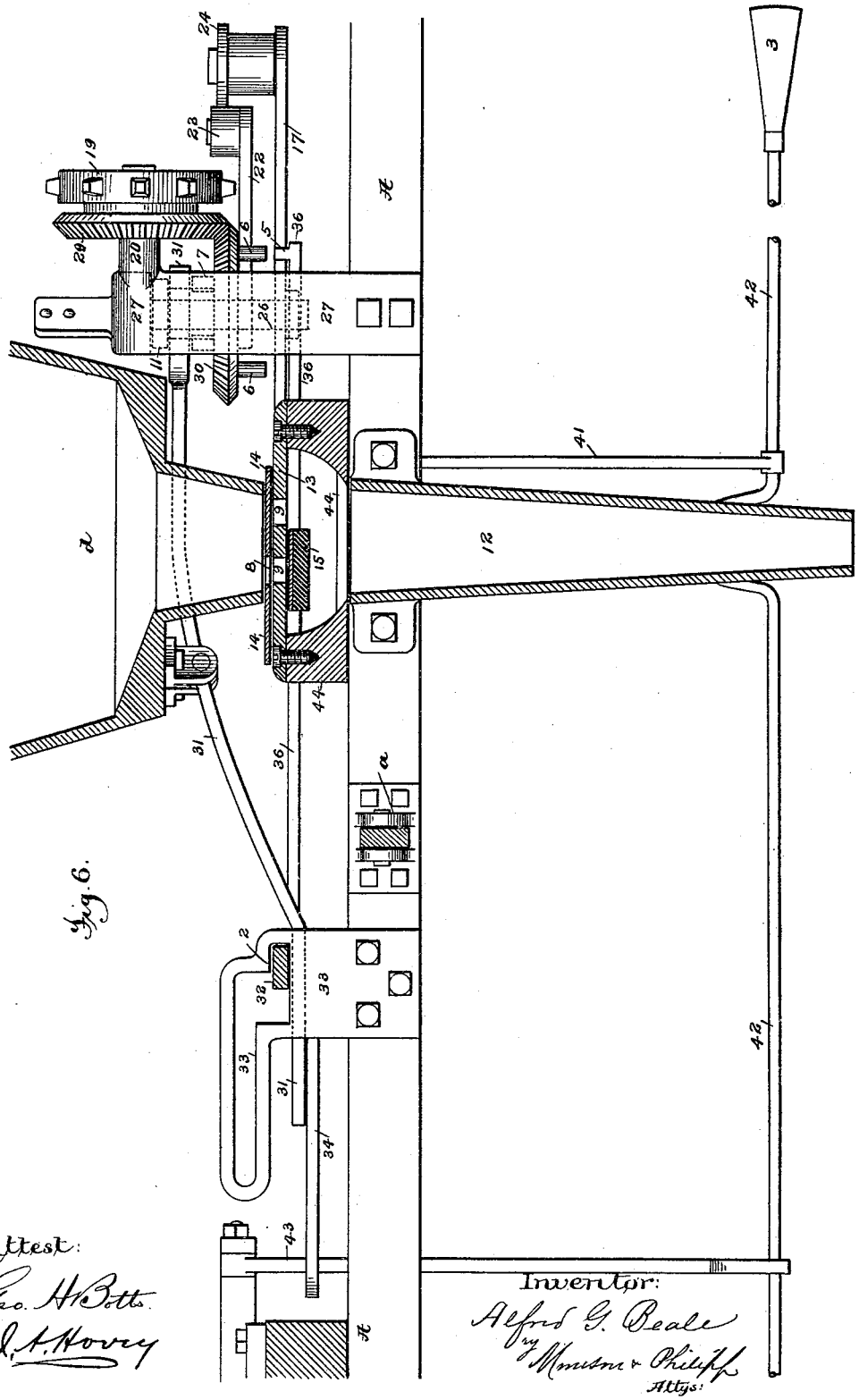

(No Model.) 6 Sheets—Sheet 6.
A. G. BEALE.
CORN PLANTER.
No. 377,059. Patented Jan. 31, 1888.
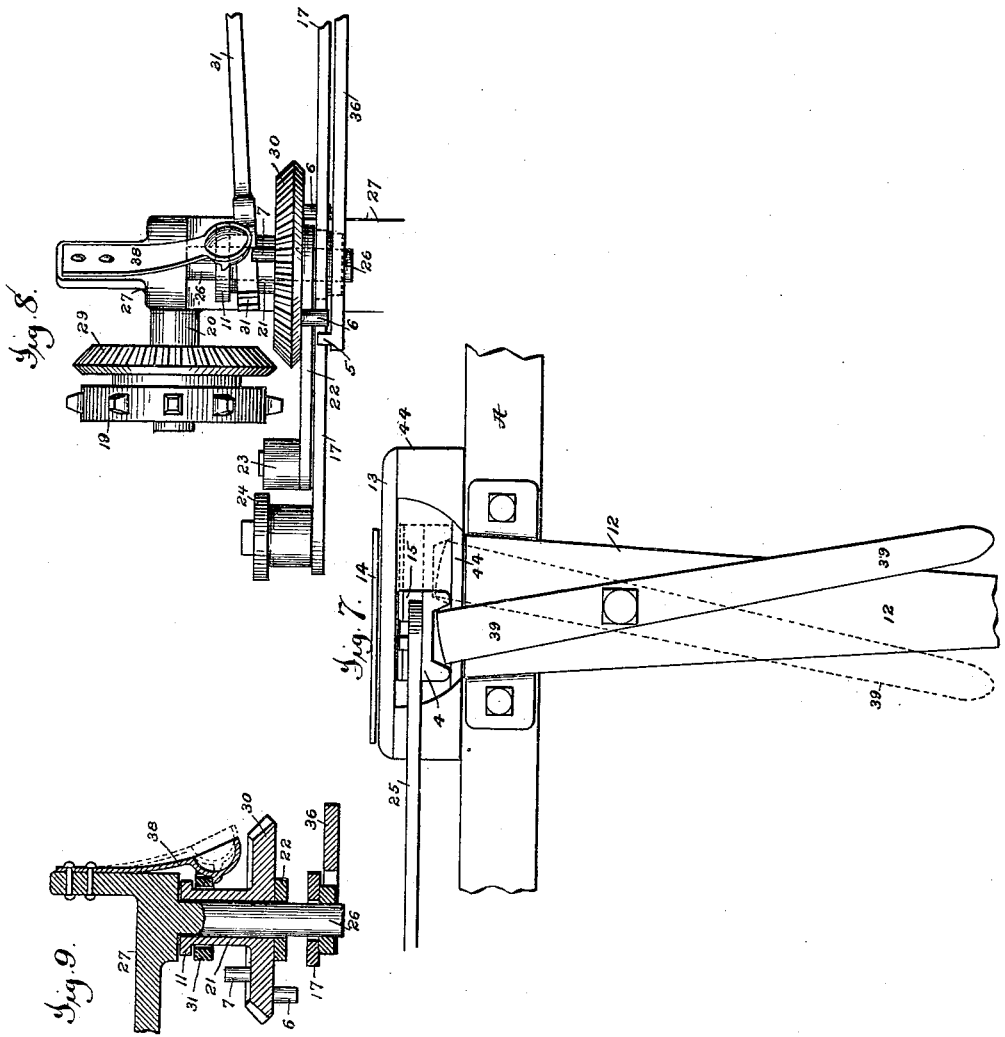

UNITED STATES PATENT OFFICE.

ALFRED G. BEALE, OF DUBLIN, COUNTY OF DUBLIN, IRELAND, ASSIGNOR OF ONE-HALF TO WILLIAM MACKENZIE, OF SAME PLACE.

CORN-PLANTER.

SPECIFICATION forming part of Letters Patent No. 377,059, dated January 31, 1888.

Application filed January 12, 1887. Serial No. 224,098. (No model.)

*To all whom it may concern:*

Be it known that I, ALFRED G. BEALE, a subject of the Queen of Great Britain, residing at Dublin, county of Dublin, Ireland, have invented certain new and useful Improvements in Corn-Planters, fully described and represented in the following specification and the accompanying drawings, forming a part of the same.

This invention relates to that general class of corn-planters by which the corn is planted in hills, which are arranged in such relation to each other as to form rows extending in directions at right angles to each other, thereby permitting the growing corn to be cultivated in two or more directions.

It is the object of the invention to provide a planter by which this can be accomplished automatically and with accuracy and without the employment of what is known as a "wire check-rower."

As a full understanding of the invention can only be given by an illustration and description of the organization and operation of a planter embodying the same, all preliminary description will be omitted and a full description given, reference being had to the accompanying drawings, in which—

Figure 1 is a side elevation of a corn-planter embodying the improvements constituting the present invention. Fig. 2 is a plan view of the same, one of the seed-hoppers being removed. Fig. 3 is an enlarged view of a part of Fig. 2. Fig. 4 is an enlarged view, partly in section, of a part of Fig. 1. Fig. 5 is a still more enlarged view, taken on the line $x\,x$ of Fig. 3, looking rearward. Fig. 6 is a sectional view upon a like scale, taken on the line $y\,y$ of the same figure, looking forward. Fig. 7 is a view upon a like scale, taken upon the line $v\,v$ of the same figure, looking forward. Fig. 8 is a view of a part of Fig. 5, showing the parts in a different position to illustrate the operation; and Fig. 9 is an enlarged section taken on the line $w\,w$ of Fig. 3.

The improvements constituting the present invention may be applied to any or almost any of the planters embraced in this general class; but they are particularly applicable to what is known as the "Deere Planter," and are therefore in the drawings shown as applied to a planter of that construction.

This planter consists, essentially, of a framework, A, which is rigidly connected to the tongue B of the machine, and is provided with a pair of shoes or runners, C, which are made of such form as to cut into the ground and form furrows or trenches of the proper depth to receive the corn. The frame A is hinged, as shown at $a$, to a second frame, D, which is supported upon the axle E of a pair of wheels, F, located directly behind the shoes C, and which serve to close the trenches made by the shoes, and thus cover the corn. The frame D and the axle E support the usual seat, H, for the driver, and the axle also supports the usual treadle-lever, G, which is connected to the rear of the frame A and serves as a means for raising the shoes C out of the ground when desired. The rearward extension of the frame A is also provided with a cross-bar, $b$, the ends of which are arranged to move freely up and down in guides $c$, attached to the sides of the frame D, and which serve to give rigidity to the whole machine.

The frame A is provided directly over the rear ends of the shoes C with two hoppers, $d$, which contain the seed-corn, and from which the corn as it is dropped passes through chutes 12 and is deposited in the bottoms of the trenches formed by the shoes C. The dropping devices or dropping mechanism proper— that is to say, the devices for separating the proper number of kernels for each hill from the corn in the hoppers $d$ and for allowing the kernels thus separated to fall into the chutes 12—are of substantially the usual form. In the case of one of the hoppers—that at the left-hand side of the machine, as shown in the present case—these devices are or may be of the same form as in the ordinary and well-known Deere planter, and are therefore not illustrated. The slide 10 for operating these devices is, however, in part shown, and the rod 25, through which motion is communicated to the slide from the opposite side of the machine, is also shown. The devices which operate in connection with the hopper upon the other side of the machine are somewhat modified in form, as will hereinafter appear, although they operate upon substantially the same principle.

The dropping mechanisms, instead of being operated by hand or by means of a check-wire stretched across the field, are operated at the proper time by means of mechanism driven from one of the wheels F, which mechanism is so arranged, as will be presently explained, that the dropping is caused to take place at the proper time to cause the hills to be in rows in both directions. For this purpose the hopper d at the right-hand side of the machine, as shown in the present case, is provided at its bottom with a plate, 13, which is supported upon a base-plate, 44, attached to the frame A, and has two openings, 9, of sufficient size to receive the proper number of kernels for a hill. These openings are so arranged that they both open downward into the chute 12 at that side of the machine. Located above the plate 13, and arranged to move laterally thereon, is a plate, 14, having an opening, 8, which is arranged to register with the openings 9 alternately, and located beneath the plate 13 is a plate, 15, which has a motion corresponding to the motion of the plate 14, but is arranged so as to cover whichever one of the openings 9 is in register with the opening 8, and to leave the other opening 9 uncovered. These plates 14 15 are connected to a lever, 16, which extends forward and is fulcrumed on the plate 44, as shown at e, and is pivotally connected to a bar, 17, which is supported on a stud or shaft, 26, extending downward from a bracket, 27, supported on the end of one of the frame-pieces A, and is slotted so as to have a limited reciprocating movement.

The hub of the wheel F, upon the right-hand side of the machine, is provided with a sprocket-wheel, 18, carrying a chain, 28, which also passes around a similar wheel, 19, mounted on a stud, 20, extending from the side of the bracket 27. The hub of the wheel 19 is provided with a bevel-gear, 29, which engages with a similar gear, 30, secured to a sleeve, 21, which is mounted on the stud 26 and arranged to have a movement up and down on the stud sufficient to throw the gears 29 30 into and out of engagement. The gear 30 is provided upon its lower face with an arm, 22, carrying a bowl, 23, which, as the the gear revolves, engages at opposite points of its revolution with bowls 24, mounted upon the ends of the bar 17, and thus moves said bar longitudinally, first in one direction and then in the other, and thereby, through the lever 16, shifts the plates 14 15, so as to drop a hill at each half-revolution of the gear 30. The sleeve 21 is provided at its upper end with a collar or enlargement, 11, beneath which fits the forked end of a lever, 31, the opposite end of which is acted on in such manner, as will be presently explained, as to normally hold the sleeve 21 in its raised position and the gears 29 30 in engagement. The inner end of the lever 31 passes beneath a lever, 32, which works in a guide, 33, and is pivoted to one arm of a bell-crank lever, 34, which is fulcrumed in a bracket, 35, extending forward from one of the frame-pieces A. These parts are so arranged that when the lever 32 is depressed, as shown in Figs. 5 and 6, the lever 31 will be rocked, so as to lift the sleeve 21 and hold the gears 29 30 in engagement, and that when the lever 32 is raised so as to be moved along the horizontal portion of the guide 33 the lever 31 will be permitted to rock so as to allow the gears to become disengaged. The purpose of this will appear when the operation of the machine is described. The lever 34 is pivotally connected to a horizontal bar, 36, which slides upon a stud, 37, and is slotted so as to have a limited longitudinal movement, and the outer end of which lies just beneath the gear 30. The bracket 27 is provided with a spring-catch, 38, which engages with the forked end of the lever 31 in such a way as to hold the sleeve 21 in its raised position and the gears 29 30 in engagement after the lever 31 has been released, so that its outer end is free to rock downward; and the upper face of the gear 30 is provided with two studs, 7, located diametrically opposite each other, which are arranged to engage with the lower end of the catch 38 in such a way as to spring it outward and release the lever 31 and sleeve 21 at each half-revolution of the gear. The gear 30 is also provided on its under face with two downwardly-projecting studs, 6, also arranged diametrically opposite each other, but somewhat in the rear (the direction of the movement of the gear being considered) of the studs 7. The catch 38 and studs 7 6 are so positioned with relation to each other that whenever the sleeve 21 and gear 30 are allowed to fall, by reason of either one of the studs 7 coming into contact with the catch, the corresponding one of the studs 6 will be in such position that it will fall just inside of and in position to be engaged by a flange, 5, formed on the end of the bar 36. The purpose of these various features will also be made clear when the operation of the machine is described. The plate 15 is provided with a rearward extension, 4, to which the bar 25 is pivoted, and in the under side of which is formed a recess in which rests the end of a vertical rod, 39, which is pivoted upon the rear side of the chute 12, and the lower end of which is in such position that as it is vibrated by the movement of the plate 15 it will cut into the ground and make a mark just over each hill planted. The purpose of this will also appear when the operation of the machine is described.

Extending forward from the frame-piece A is a pair of brackets, 40, from which depend rods 41, in which is suspended a horizontal rod, 42, which extends across the machine with its ends 3 projecting outward from the shoes C a distance equal to or about equal to the distance between two of the planted rows.

Depending from the frame-work A, and in front of the free arm of the lever 34, is a third rod, 43, the lower end of which is bifurcated and straddles the rod 42. The purpose of these devices will also appear when the operation of the machine is described.

The operation of the machine thus organized is as follows: The hoppers d being supplied with corn and the machine brought into position, the lever 32 will be moved to the right and pressed downward and carried beneath the shoulder 2 of the guide 33. This will depress the lever 31 and raise the gear 30 into engagement with the gear 29. The machine being then started across the field, the motion of the wheel F will, through the chain 28 and gear 29, revolve the gear 30 and with it the arm 22. As the arm is thus revolved the bowl 23 will at each half-revolution of the arm come into engagement with one of the bowls 24 and move the bar 17 longitudinally first in one direction and then in the other. At each movement of the bar 17 the lever 16 will be rocked so as to shift the plates 14 15, thereby allowing the corn for one hill to drop downward through the chute 12 into the trench formed by the shoe C, thus planting one hill. Each time the lever 16 is thus rocked to drop a hill upon that side of the machine the rod 25 and slide 10 will be shifted, so that at the same time a hill will be dropped upon the other side of the machine, and this will continue until the machine has been driven across the field. It will be seen that the hills thus dropped will be at uniform and regular intervals—that is to say, the distance between each two hills in the rows will be the travel of the machine required to give a half-revolution to the gear 30—and the wheels 18 19 and gears 29 30 will be so proportioned that the distance between each two hills in the rows will be what is required for the proper working of the growing crop.

As the lever 16 and the plates 14 15 are shifted to drop each hill, the rod 39 will be rocked upon its pivot so as to be vibrated laterally, and the movement thus given to the lower end of the rod will cause the rod to make a mark across the row above each hill planted, which will indicate the position of each hill in the row.

When the ends of the first rows are reached, the lever 32 will be moved out from beneath the shoulder 2 and raised to the top of the guide 33. This will allow the rear end of lever 31 to rock upward and permit the sleeve 21 to drop so as to disengage the gear 30 from the gear 29. If, however, neither one of the studs 7 happens to be at such time in engagement with the catch 38, the catch will temporarily hold the sleeve in its raised position. After the lever 32 has been thus moved the machine will be driven out to the edge of the field and turned around and brought into position to commence the next rows. As soon as the machine is started, after the lever 32 has been moved as just stated, or as soon as it has been moved a very short distance in being turned around, one of the studs 7 will be brought into engagement with the catch 38, and as soon as this takes place the sleeve 21 will drop so as to disengage the gear 30 from the gear 29, as shown in Fig. 8, and, as before explained, when this takes place one of the studs 6 will be in position to fall in front or inside of the flange 5 at the end of the bar 36.

When the machine has been brought into position to commence the planting of the next rows and has been advanced to near the position where the first hills should be dropped, the lever 32 will be moved along the horizontal portion of the guide 33 to the limit of its movement in that direction. This will rock the lever 34 so as to swing the rod 43, and with it the rod 42, forward, and will at the same time move the bar 36 inward, thereby causing the flange 5 to engage with the stud 6 and turn the gear 30 and arm 22 backward a short distance. The machine will then be advanced until the end 3 of the rod 42 is exactly over the last hill in the row last planted, the position of which hill will be indicated by the mark made by the vibration of the rod 39. The guide 33, levers 32 34, and the bar 36 are so proportioned that if when the machine and the parts are in the position just stated the gear 30 is thrown into engagement with the gear 29 and the machine is started the first hills dropped in the new rows will be in line with the last hills in the last rows planted. When, therefore, the machine has been brought to the position just stated, the lever 32 will be moved back along the guide 33 and depressed and carried under the shoulder 2. This will depress the lever 31 and raise the sleeve 21, so as to carry the gear 30 into engagement with the gear 29. The machine being then started, the first hills in the new rows will be dropped in line with the last hills of the last rows, and so on.

If at any point in the travel of the machine across the field the dropping should get out of proper time, it can readily be corrected by resetting the machine in the manner just described.

The wheel F may be provided with two or more of the wheels 18 of different sizes, so that by shifting the chain 28 from one wheel to another the distance between the hills in the rows can be varied.

By providing one of the wheels 18 of comparatively large size the dropping may be made at such short intervals that the machine can be used as a drill-dropper.

The plate 13 is made removable, as shown, so that a plate having larger or smaller openings 9 can be substituted to vary the number of kernels dropped for each hill.

What I claim is—

1. The combination, with the dropping mechanism, of the lever 16, bar 17, movable gear 30, having the arm 22, and the lever 31, substantially as described.

2. The combination, with the lever 16, carrying the plates 14 15 and connected to the vibrating rod 39, of the bar 17, the gear 30, having the arm 22, and the gear 29, driven from one of the wheels of the machine, substantially as described.

3. The combination, with the gear 30, having the arm 22 for operating the dropping mechanism, and the studs 6, of the lever 31 and the bar 36, having the flange 5, substantially as described.

4. The combination, with the movable gear 30 and the lever 31, of the catch 38 and studs 7, substantially as described.

5. The combination, with the levers 32 34, of the lever 31, bar 36, and gear 30, substantially as described.

6. The combination, with the levers 32 34, of the lever 31, bar 36, gear 30, catch 38, and gear 29, substantially as described.

7. In a corn-planter, the combination, with an automatically-operated dropping mechanism, of means for setting the mechanism so that the dropping will take place when the machine has been moved a given distance from any point, substantially as described.

In testimony whereof I have hereunto set my hand in the presence of two subscribing witnesses.

ALFRED G. BEALE.

Witnesses:
J. A. HOVEY,
T. H. PALMER.